(12) United States Patent
Lee et al.

(10) Patent No.: US 9,008,668 B2
(45) Date of Patent: Apr. 14, 2015

(54) SERVICE HANDOVER CONTROL APPARATUS USING AN END-TO-END SERVICE HANDOVER AND METHOD USING THE APPARATUS

(75) Inventors: Su-won Lee, Seongnam-si (KR); Xiaoyu Liu, Yongin-si (KR); John Williams Floroiu, Berlin (DE); Eun Sun Jung, Seoul (KR); Hee Jin Jang, Yongin-si (KR); Marius Corici, Berlin (DE); Byoung Joon Lee, Seongnam-si (KR)

(73) Assignees: Samsung Electronics Co., Ltd., Suwon-si (KR); Fraunhofer Gesellschaft zur Foerderung der angewandten Forschung e.V., Munich (DE)

( * ) Notice: Subject to any disclaimer, the term of this patent is extended or adjusted under 35 U.S.C. 154(b) by 1071 days.

(21) Appl. No.: 11/984,023

(22) Filed: Nov. 13, 2007

(65) Prior Publication Data
US 2008/0167045 A1    Jul. 10, 2008

(30) Foreign Application Priority Data

Jan. 10, 2007 (KR) .................. 10-2007-0002915
Jul. 19, 2007 (KR) .................. 10-2007-0072498

(51) Int. Cl.
*H04W 36/00* (2009.01)
*H04W 36/26* (2009.01)
(Continued)

(52) U.S. Cl.
CPC .......... *H04W 36/26* (2013.01); *H04W 36/0022* (2013.01); *H04W 36/30* (2013.01); *H04L 65/1083* (2013.01); *H04M 7/1235* (2013.01); *H04W 36/005* (2013.01)

(58) Field of Classification Search
CPC .............. H04L 65/1016; H04L 65/104; H04L 65/1069; H04L 65/1023; H04L 65/1033; H04L 65/103; H04L 65/1006; H04L 65/1046; H04L 65/1083; H04L 65/1086; H04W 92/02; H04W 76/02; H04W 80/00; H04W 76/022; H04W 80/04; H04W 36/0022; H04W 88/16; H04W 76/028; H04W 92/06; H04W 76/04; H04W 36/005; H04W 36/14; H04W 36/18; H04M 7/1235

USPC .................. 370/328–333, 352, 356, 401; 455/435.1, 435.3, 436–444, 550, 555, 455/405–409

See application file for complete search history.

(56) References Cited

U.S. PATENT DOCUMENTS 6,157,834 A * 12/2000 Helm et al. .................. 455/436
6,243,581 B1     6/2001 Jawanda
(Continued)

FOREIGN PATENT DOCUMENTS

JP     2002-152224    5/2002
KR  10-2002-0067515   8/2002
(Continued)

OTHER PUBLICATIONS

Arkko et al., "Network Discovery and Selection Problem", draft-ietf-eap-netsel-problem-02 (work-in-progress), Oct. 25, 2004.*

(Continued)

*Primary Examiner* — Olumide T Ajibade Akonai
(74) *Attorney, Agent, or Firm* — NSIP Law

(57) ABSTRACT

A service handover control apparatus and a method using the apparatus are provided. The service handover control apparatus includes a service handover management unit collecting information associated with a transmitting terminal and a wireless access network, which operate based on an Internet Protocol multimedia subsystem (IMS), and outputting a control signal which controls service handovers of the transmitting terminal and the receiving terminal based on the collected information; and a service handover controller providing the service handover management unit with the information associated with the transmitting terminal and the receiving terminal, and controlling the service handovers of the transmitting terminal and the receiving terminal based on the control signal.

24 Claims, 8 Drawing Sheets

(51) Int. Cl.
  *H04W 36/30* (2009.01)
  *H04L 29/06* (2006.01)
  *H04M 7/12* (2006.01)

(56) References Cited

U.S. PATENT DOCUMENTS

| | | | | |
|---|---|---|---|---|
| 7,215,957 | B2* | 5/2007 | Ekman et al. | 455/436 |
| 7,551,585 | B2* | 6/2009 | Foti et al. | 370/331 |
| 7,646,777 | B2* | 1/2010 | Hicks et al. | 370/401 |
| 7,697,479 | B2* | 4/2010 | Metke et al. | 370/331 |
| 7,738,882 | B2* | 6/2010 | Dutta et al. | 455/456.1 |
| 7,792,081 | B2* | 9/2010 | Kim et al. | 370/331 |
| 8,023,479 | B2* | 9/2011 | Silver et al. | 370/338 |
| 8,103,277 | B2* | 1/2012 | Wee | 455/436 |
| 2004/0030791 | A1* | 2/2004 | Dorenbosch et al. | 709/230 |
| 2005/0180355 | A1* | 8/2005 | Kim et al. | 370/328 |
| 2006/0268781 | A1* | 11/2006 | Svensson et al. | 370/331 |
| 2007/0268873 | A1* | 11/2007 | Borella et al. | 370/338 |

FOREIGN PATENT DOCUMENTS

| | | |
|---|---|---|
| KR | 10-2003-0065232 A | 8/2003 |
| KR | 10-2003-0089773 A | 11/2003 |
| KR | 10-2004-0037637 A | 5/2004 |
| KR | 10-0453325 | 10/2004 |
| KR | 10-2006-0026722 A | 3/2006 |
| KR | 10-2006-0040412 A | 5/2006 |
| WO | WO 01/22662 A1 | 3/2001 |

OTHER PUBLICATIONS

Zdarsky et al., "Handover in Mobile Communication Networks: Who is in Control Anyway?", Euromicro Conference, 2004. Proceedings. 30th, pp. 205-212, Aug. 31-Sep. 3, 2004.*

Korean Office Action issued Jun. 20, 2013 in corresponding Korean Application No. KR-10-2007-0072498. (4 pages, in Korean).

* cited by examiner

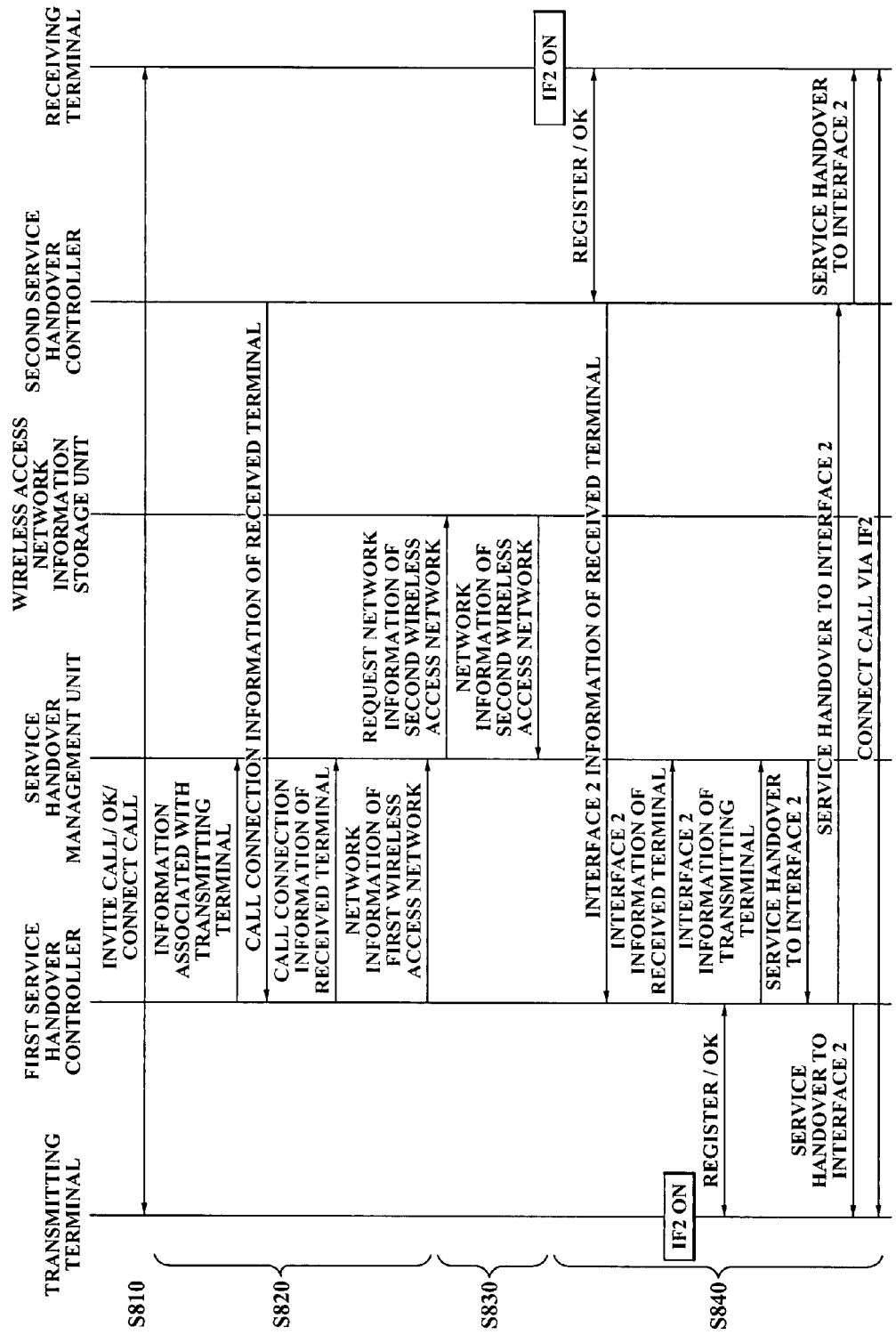

SERVICE HANDOVER CONTROL APPARATUS USING AN END-TO-END SERVICE HANDOVER AND METHOD USING THE APPARATUS

CROSS-REFERENCE TO RELATED APPLICATION

This application claims the benefit under 35 U.S.C. §119 (a) of Korean Patent Application Nos. 10-2007-0002915, filed on Jan. 10, 2007, and 10-2007-0072498 filed on Jul. 19, 2007 in the Korean Intellectual Property Office, the entire disclosure of both of which are hereby incorporated by reference.

BACKGROUND OF THE INVENTION

1. Field of the Invention

The present invention relates to a service handover. More particularly, the present invention relates to an end-to-end service handover control apparatus which controls an end-to-end service handover between terminals using information associated with the terminals which operate based on an Internet Protocol multimedia subsystem (IMS), and a method using the apparatus.

2. Description of Related Art

A function of an Internet Protocol multimedia subsystem (IMS) is to provide a new service in Internet Protocol (IP) based wireless access network environments. The IP based wireless access network environments may include a wireless LAN (WLAN), a wireless broadband (WiBro), a world interoperability for microwave access (WiMax), and a wideband code division multiple access (WCDMA).

Terminals, which are operating on an IMS based network, are equipped with various network interfaces capable of connecting to various wireless access networks to smoothly operate in various access network environments.

When either a speech telecommunication or a video telecommunication is performed between terminals which are operating on an IMS based network, each of the terminals performs the telecommunication via a network interface capable of connecting to the each of the terminals.

Each of the terminals continuously performs telecommunications via a handover to another wireless access network environment when each of the terminals moves to the other wireless access network environment while performing telecommunications.

However, in a conventional handover, a handover prevents a cutting-off of a call which is being performed, but the handover cannot provide an end-to-end service handover to improve a call quality between the terminals.

When a user of a transmitting terminal requests a video telecommunication, and when a receiving terminal is not located in a wireless access network environment capable of performing the video telecommunication, only a speech telecommunication is performed.

While the speech telecommunication is being performed, even when the receiving terminal performs a handover, that is, even when the receiving terminal moves to another wireless access network environment capable of performing the video telecommunication, the video telecommunication can not be performed in the conventional handover.

In other words, the initially connected telecommunication is limited to speech since the terminal cannot acquire information about other terminals even when it is possible to perform the video telecommunication.

Also, when a call is performed between a terminal located in a wireless access network whose bandwidth is comparatively large and a terminal located in a wireless access network whose bandwidth is comparatively small, the terminal located in the wireless access network whose bandwidth is comparatively large unnecessarily wastes resources.

Accordingly, there is a need for an apparatus which can provide an end-to-end service handover based on information about another terminal.

SUMMARY OF THE INVENTION

An aspect of exemplary embodiments of the present invention is to address at least the above problems and/or disadvantages and to provide at least the advantages described below. Accordingly, an aspect of exemplary embodiments of the present invention is to provide a service handover control apparatus and a method using the apparatus which can perform an end-to-end service handover by collecting information associated with terminals whose calls are connected with each other.

An aspect of exemplary embodiments of the present invention is to provide a service handover control apparatus and a method using the apparatus which can reduce an unnecessary waste of resources using an end-to-end service handover.

An aspect of exemplary embodiments of the present invention also provides a service handover control apparatus and a method using the apparatus which can provide a call quality with respect to a call condition of a transmitting terminal when the call condition, predetermined by a user of the transmitting terminal, occurs using information associated with terminals.

According to an aspect of exemplary embodiments of the present invention, there is provided a service handover control apparatus for controlling service handovers between a plurality of wireless access networks, the apparatus comprising a terminal capable of communicating using the plurality of wireless access networks and of generating a control signal which controls the service handovers based on information comprising call connection information of the terminal, first network information of a first wireless access network the terminal currently accesses, and second network information of a second wireless access network the terminal will access.

According to an aspect of exemplary embodiments of the present invention, there is provided a service handover control apparatus including a service handover management unit for collecting information associated with a transmitting terminal and a receiving terminal which operate based on an Internet Protocol multimedia subsystem (IMS), and for outputting a control signal which controls service handovers of the transmitting terminal and the receiving terminal based on the collected information; and a service handover controller for providing the service handover management unit with the information associated with the transmitting terminal and the receiving terminal, and for controlling the service handovers of the transmitting terminal and the receiving terminal based on the control signal.

In this embodiment, the service handover controller provides the handover management unit with updated information when the information associated with the transmitting terminal and the receiving terminal is updated, and the service handover controller outputs the control signal which controls the service handovers of the transmitting terminal and the receiving terminal based on the updated information.

In this embodiment, the service handover management unit includes an information collector for collecting the information associated with the transmitting terminal and the receiving terminal; a service handover determination unit for determining whether the service handovers occur based on the collected information associated with the transmitting terminal and the receiving terminal; and a service handover provider for outputting the control signal which controls the service handovers of the transmitting terminal and the receiving terminal when the service handovers occur.

In this embodiment, the information associated with the transmitting terminal and the receiving terminal corresponds to parameters associated with a network and a service profile of each of the transmitting terminal and the receiving terminal.

In this embodiment, the information associated with the transmitting terminal includes information about a call condition with the receiving terminal.

In this embodiment, the information about the call condition with the receiving terminal is included in a session description protocol (SDP) of a call invite message, having been transmitted from the transmitting terminal to the receiving terminal.

According to an aspect of exemplary embodiments of the present invention, there is provided a service handover control method including collecting information associated with a transmitting terminal and a receiving terminal which operate based on an IMS; outputting a control signal which controls service handovers of the transmitting terminal and the receiving terminal based on the collected information; and controlling the service handovers of the transmitting terminal and the receiving terminal based on the control signal.

According to an aspect of exemplary embodiments of the present invention, there is provided a service handover control method controlling service handovers between a plurality of wireless access networks of a terminal capable of communicating using the plurality of wireless access networks including generating a control signal which controls the service handovers based on call connection information of the terminal, first network information of a first wireless access network the terminal presently currently accesses, and second network information of a second wireless access network the terminal will access; and controlling a service handover of the terminal based on the control signal.

Other objects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other objects, features, and advantages of certain exemplary embodiments of the present invention will be more apparent from the following detailed description, taken in conjunction with the accompanying drawings in which:

FIG. 8 is a diagram illustrating operations of a service handover control apparatus according to an embodiment of the present invention.

Throughout the drawings, the same drawing reference numerals will be understood to refer to the same elements, features, and structures.

DETAILED DESCRIPTION OF EXEMPLARY EMBODIMENTS

The matters defined in the description such as a detailed construction and elements are provided to assist in a comprehensive understanding of the embodiments of the invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Figure 1:
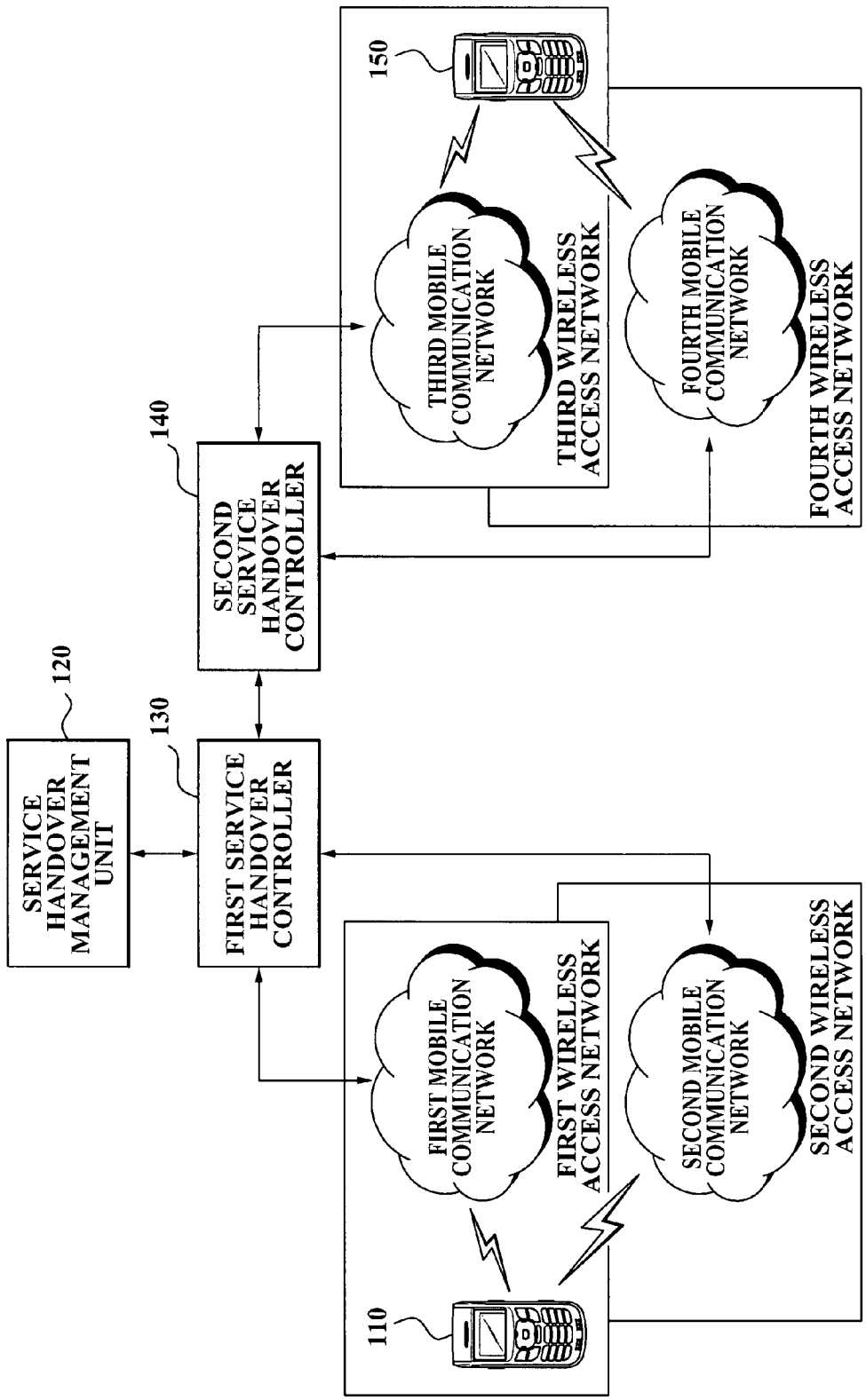
FIG. 1 illustrates a system which has adopted a service handover apparatus according to an embodiment of the present invention.

FIG. 1 illustrates a system which has adopted a service handover apparatus according to an embodiment of the present invention.

In this embodiment, apparatuses included in the system operate based on an Internet Protocol multimedia subsystem (IMS).

Referring to FIG. 1, the system includes a transmitting terminal 110, a receiving terminal 150, a first service handover controller 130, a second handover controller 140, and a service handover management unit 120.

The transmitting terminal 110 is a terminal which requests a speech telecommunication or a video telecommunication.

In this embodiment, the transmitting terminal 110 may request the speech telecommunication or the video telecommunication via a first mobile communication network included in a first mobile access network, and may request the speech telecommunication or the video telecommunication via a second mobile communication network included in a second mobile access network.

In this embodiment, the transmitting terminal 110 may include information about a call condition predetermined by a user of the transmitting terminal 110 in a call request message when transmitting a call invite message, i.e. a call requesting message, to a receiving terminal.

In this embodiment, the information about the call condition of the transmitting terminal may be included in a session description protocol of the invite message, and may correspond to a type of a medium for a call, a bandwidth, and a call charge.

In this embodiment, an existing invite message is used to connect a call using a possible service at transmitting/receiving end, and the information about the call condition may be included in an update message.

The receiving terminal 150 is a terminal which receives requests for a speech telecommunication or a video telecommunication.

In this embodiment, the receiving terminal 150 may receive the speech telecommunication or the video telecommunication via a third mobile communication network included in a third wireless access network, and may receive the speech telecommunication or the video telecommunication via a fourth mobile communication network included in a fourth mobile access network.

The first service handover controller 130 is a type of a service handover controller, located in a core network of the transmitting terminal 110, provides the service handover management unit 120 with information associated with the transmitting terminal 110 and the receiving terminal 150, and controls a service handover of the transmitting terminal after receiving control signals which control service handovers of the transmitting terminal 110 and the receiving terminal 150.

In this embodiment, the first service handover controller 130 may provide the service handover management unit 120 with the information associated with the transmitting terminal 110 and the receiving terminal 150 after receiving the information associated with the transmitting terminal 110 and the receiving terminal 150 from a second service handover controller.

In this embodiment, the first service handover controller 130 may provide the second service handover controller with the control signal after receiving the control signal from the service handover management unit 120, the control signal controlling the service handover of the receiving terminal 150.

In this embodiment, the first service handover controller 130 may provide the service handover management unit 120 with updated information when the information associated with the transmitting terminal and the receiving terminal is updated.

In this embodiment, the information associated with the transmitting terminal 110 and the receiving terminal 150 correspond to parameters associated with a network and a service profile of each of the transmitting terminal 110 and the receiving terminal 150.

In this embodiment, the parameters associated with the network and the service profile may correspond to a wireless access network which is accessible from a terminal, a quality of service (QoS) of the wireless access network, a session profile of the terminal, a call charge, an interface profile of the terminal, and a user profile of the terminal.

In this embodiment, the first service handover controller 130 may provide the service handover management unit 120 with an interface profile, having been requested registration, when a network interface of the transmitting terminal 110 enters an on mode, and when there is a registration request from the transmitting terminal 110.

In this embodiment, the first handover controller 130 may extract the information about the call condition from the call invite message transmitted from the transmitting terminal 130, and may provide the service handover management unit 120 with the extracted information about the call condition.

The second handover controller 140 provides the first service handover controller 130 with the information associated with the receiving terminal 150, and controls the service handover of the receiving terminal 150 after receiving the control signal which controls the service handover of the receiving terminal 150 from the first service handover controller 130.

In this embodiment, the second service handover controller 140 may provide the first service handover controller 130 with updated information when the information associated with the receiving terminal 150 is updated.

In this embodiment, the second service handover controller 140 may provide the first service handover controller 130 with an interface profile of the receiving terminal 150, having been requested registration, when a network interface of the receiving terminal 150 enters an on mode, and when there is a registration request from the receiving terminal 150.

In this embodiment, the first service handover controller 130 and the second service handover controller 140 may be a serving call session control function (S-CSCF) on an IMS based network.

The service handover management unit 120 collects the information associated with the transmitting terminal 110 and the receiving terminal 150, which is provided from the first service handover controller 130, generates the control signal which controls the service handovers of the transmitting terminal 110 and the receiving terminal 150 based on the collected information, and provides the first service handover controller 130 with the generated control signal.

Namely, the service handover management unit 120 generates the control signal which controls the service handovers of the transmitting terminal 110 and the receiving terminal 150 based on information of the transmitting terminal 110 and the receiving terminal 150, such as network interface, a bandwidth, and a call charge, and outputs the generated control signal to the first service handover controller 130.

Specifically, the service handover management unit 120 may calculate a delay time which is required from the transmitting terminal 110 to the receiving terminal 150 using information associated with collected wireless access networks of each of the terminals capable of connecting the transmitting terminal 110 to the receiving terminal 150, and may generate the control signal which controls the service handovers of the transmitting terminal 110 to the receiving terminal 150 based on the calculated delay.

In this embodiment, the service handover management unit 120 may provide the first service handover controller 130 with the control signal which controls the service handovers of the transmitting terminal 110 to the receiving terminal 150 only when the service handovers are required to be performed using the information associated with the transmitting terminal 110 to the receiving terminal 150.

In this embodiment, the service handover management unit 120 may be included in any one of a router equipped in the core network, an application server which provides an application, and a terminal; particularly, the service handover management unit 120 may be included in an application server.

In FIG. 1, the service handover management unit 120 is connected to the first service handover controller 130, and the service handover management unit 120 is located in the core network in which the first service handover controller 130 is included; however, this is just one of various examples. For example, in an alternative embodiment, the service handover management unit 120 may be connected to the second handover controller 140 by including the second service handover controller 140 in the core network.

Also, the service handover management unit 120 may be connected to two service handover controllers, instead of being connected to any one of the first service handover controller 130 and the second service handover controller 140.

Also, a service handover controller may be prepared to be connected to each of the first service handover controller 130 and the second service handover contoller 140.

Figure 2:
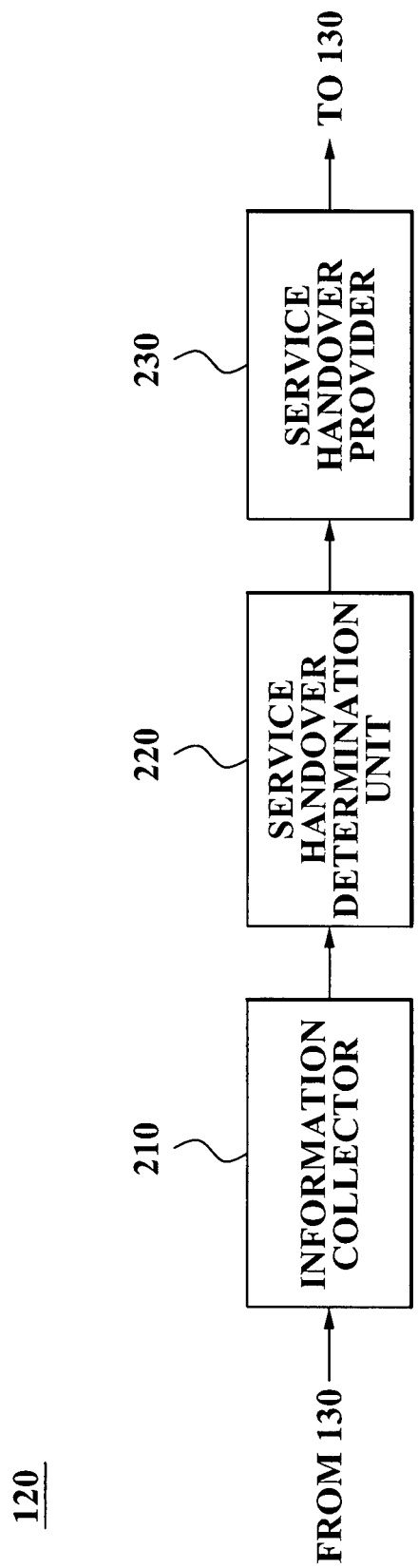
FIG. 2 is a block diagram illustrating a configuration with respect to a service handover management unit of FIG. 1.

FIG. 2 is a block diagram illustrating a configuration with respect to the service handover management unit 120 of FIG. 1.

Referring to FIG. 2, the service handover management unit 120 includes an information collector 210, a service handover determination unit 220, and a service handover provider 230.

The information collector 210 collects information associated with a transmitting terminal and a receiving terminal, provided from the first service handover controller 130 of FIG. 1.

In this embodiment, the information associated with the transmitting terminal and the receiving terminal may include information about a call condition predetermined by a user of the transmitting terminal.

As an example, the information collector 210 may collect information such as a service profile and a charge for the user.

In this embodiment, the information collector 210 may collect information about at least one wireless access network which is connected to the transmitting terminal and information about at least one wireless access network which is connected to the receiving terminal.

Specifically, the information collector 210 may collect information about the terminal, such as whether a network interface is in an on mode or an off mode, the service profile and the charge for the user, and the network information about the wireless access network, which is connected to the network interface, equipped in the terminal.

In this embodiment, since the wireless access network which is connected to the transmitting terminal and the receiving terminal may be more than one, a connection route between the transmitting terminal and the receiving terminal may vary.

The service handover determination unit 220 determines whether service handovers occur based on the collected information associated with the transmitting terminal and the receiving terminal.

In this embodiment, the service handover determination unit 220 may determine whether service handovers occur based on a call condition predetermined by a user of the transmitting terminal, or the collected information associated with the transmitting terminal and the receiving terminal.

In this embodiment, the service handover determination unit 220 may determine at a predetermined time period whether the handovers occur, or determine whether the handovers occur when the information associated with the transmitting terminal and the receiving terminal is updated.

The service handover provider 230 outputs a control signal which controls a service handover when the service handovers have occurred as a result of the determination by the service handover determination unit 220.

Descriptions regarding a service handover control apparatus according to an embodiment of the present invention will be described by referring to FIG. 3.

Figure 3:
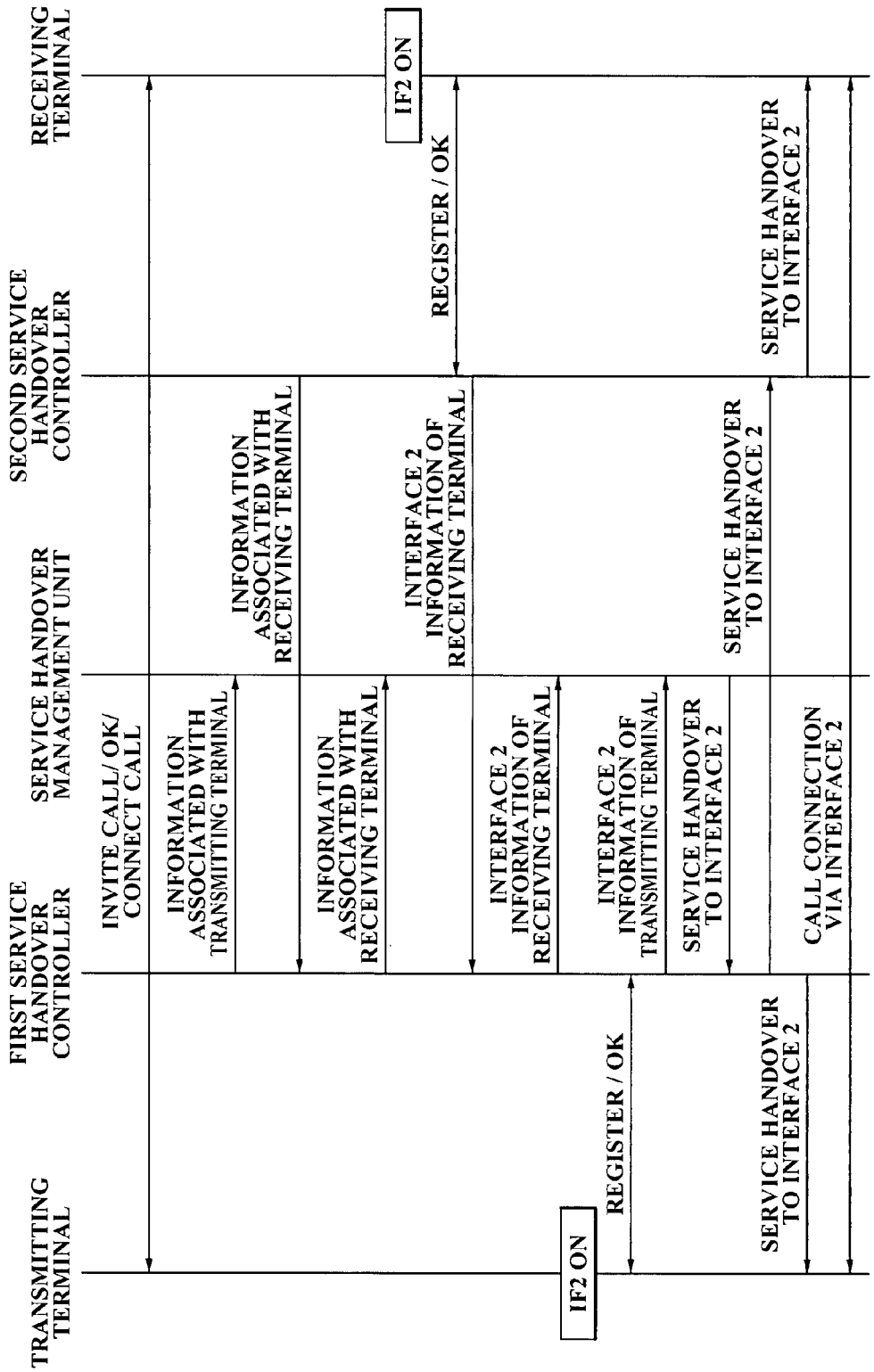
FIG. 3 is a diagram illustrating an example to describe operation of a service handover apparatus according to an exemplary embodiment of the present invention.

FIG. 3 is a diagram illustrating an example to describe operation of a service handover apparatus according to the present invention.

Referring to FIG. 3, the operation of the service handover apparatus according to an embodiment of the present invention will be described.

In this embodiment, it is assumed that only a network interface IF 1 is in an on mode among a transmitting terminal and a receiving terminal.

Also, it is assumed that the bandwidth of the wireless access network which is connected to a network interface IF 2, is greater than the bandwidth of the wireless access network which is connected to a network interface IF 1.

A call is connected via IF 1 of the receiving terminal and IF 1 of the transmitting terminal since both IF 1s of the transmitting terminal and the receiving terminal are in an on mode.

In this embodiment, a call invite message, which is transmitted from the transmitting terminal to the receiving terminal, includes information about a call condition of the transmitting terminal.

A first service handover controller acquires information associated with the transmitting terminal and the receiving terminal, and provides a service handover management unit with the acquired information such as the call invite message, a network interface profile, and information about a network.

In this embodiment, the information associated with the transmitting terminal may include information about the IF 1, i.e. the information about the network interface, the bandwidth of the wireless access network which is connected to the network interface, a charge, a user profile of the transmitting terminal, and/or the information about the call condition which is included in the call invite message.

In a non-limiting example, a second service handover controller provides the acquired information associated with the receiving terminal using a call approval message, a network interface profile, and information about the network, and provides the service handover management unit with the acquired information via a first service handover controller. Of course, the second service controller is not limited to provide the information to the service handover management unit via the first service handover controller. For example, in an alternative embodiment, the second service controller may provide the information directly to the service handover management unit.

In this embodiment, the network interface profile may become IF 1 information.

Accordingly, a call between the transmitting terminal and the receiving terminal is connected via the network interface IF 1.

After the call between the transmitting terminal and the receiving terminal is connected via the network interface IF 1, when the receiving terminal moves to the wireless access network, which is connected to the network interface IF 2, and when the IF 2 enters an on mode, information about the IF 2 of the receiving terminal is registered to the second service handover controller.

In a non-limiting example, the second service handover controller provides the service handover management unit with the information about the IF 2 of the receiving terminal via the first service handover controller. Of course, the second service controller is not limited to provide the information to the service handover management unit via the first service handover controller. For example, in an alternative embodiment, the second service controller may provide the information directly to the service handover management unit.

After the IF 2 of the receiving terminal is registered, the transmitting terminal moves to the wireless access network, which is connected to the network interface IF 2, and when the IF 2 enters an on mode, information about the IF 2 of the transmitting terminal is registered to the first service handover controller.

The first service handover controller provides the service handover management unit with the information about the IF 2 of the transmitting terminal.

The service handover management unit provides a control signal which can perform a service handover with respect to the wireless access network, which is connected to the IF 2, in order to provide a user with a call having a better quality according to a user's requesting condition since both IF 2s of the transmitting terminal and the receiving terminal are in an on mode.

In a non-limiting example, the first service handover controller outputs the control signal, which is provided from the service handover management unit, to the second service handover controller, and controls to change a service handover of the transmitting terminal to the to the IF 2 via the control signal. Of course, the service handover management unit is not limited to provide the information to the second service handover controller via the first service handover controller. For example, in an alternative embodiment, the service handover management unit may provide the information directly to the second service handover controller.

The second service handover management unit controls to change a service handover of the receiving terminal to the IF 2 via the control signal, which, in a non-limiting example, may be provided from the first service handover controller.

A call is connected via IF 2 after the service handovers of the transmitting terminal and the receiving terminal are changed to the IF 2.

Examples are described in FIG. 3 by being limited to the service handovers according to a bandwidth, however in the specification of the present invention, service handovers of the transmitting terminal and the receiving terminal may be controlled when a call service which corresponds to the information about the call condition, which is included in the call invite message, is provided.

As an example, as the call condition predetermined by the user of the transmitting terminal, it is assumed that a call charge per minute is less than A price, a bandwidth greater than 200 Kbps is provided, and a video telecommunication is provided. Under this assumption, network information about a wireless access network where each of the transmitting terminal and the receiving terminal has accessed during a call between the transmitting terminal and the receiving terminal is collected, and it is determined whether to perform the video telecommunication via updated information.

In this embodiment, a maximum bandwidth and a minimum bandwidth of the wireless access network where the each of the transmitting terminal and the receiving terminal has accessed, a number of users using a bandwidth of the wireless access network, and a usable bandwidth correspond to the wireless access information.

The service handovers are controlled to provide the video telecommunication when only a speech call is performed since the wireless access network where the transmitting terminal is connected or the wireless access network where receiving terminal is connected does not satisfy the call condition, and when the call condition, such as the usable bandwidth and the call charge, is satisfied since a traffic of the wireless access network where each of the transmitting terminal and the receiving terminal has accessed becomes decreased.

As described above, the service handover control apparatus of the present invention can reduce unnecessary waste of resources by using the information associated with the transmitting terminal and receiving terminal, and can provide a user with a call having a better quality by performing the service handovers according to the call condition.

Figure 4:
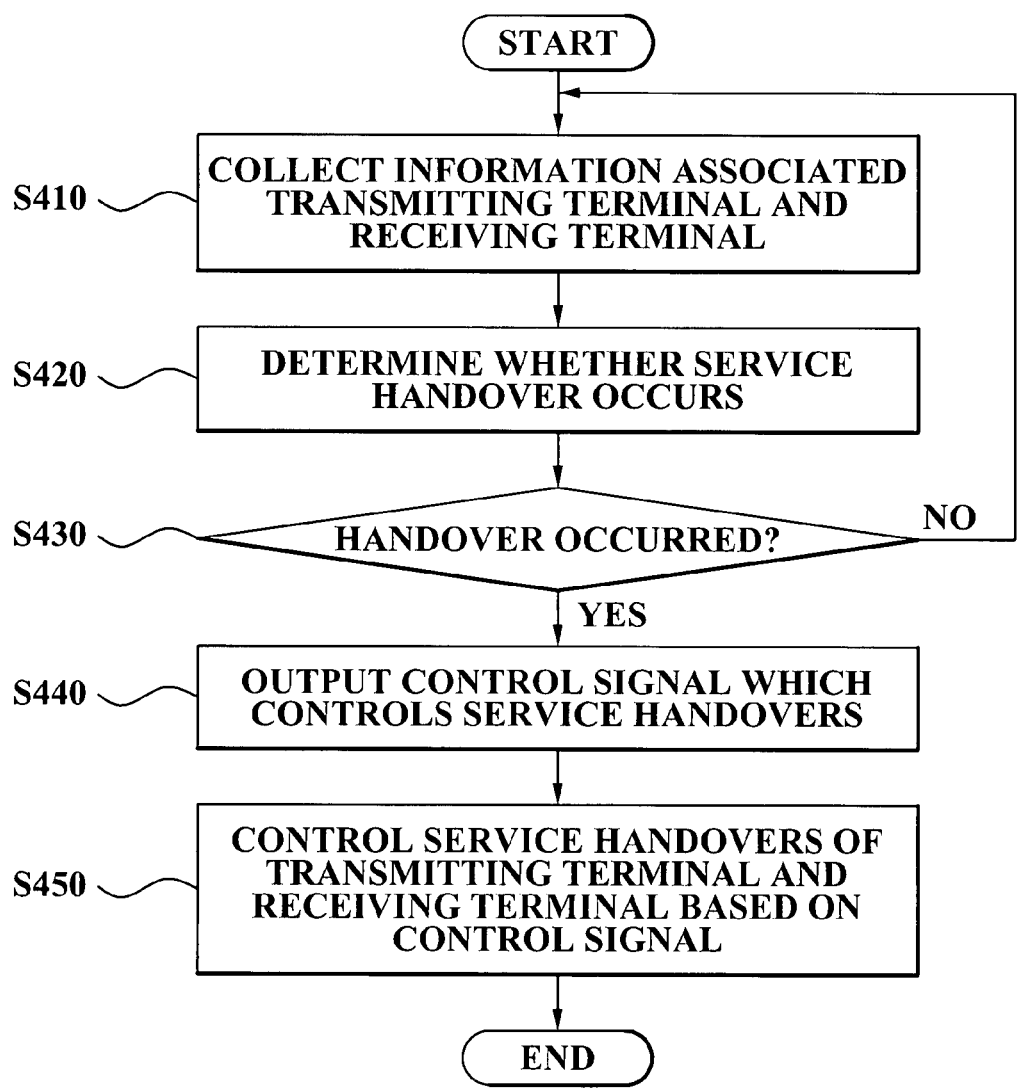
FIG. 4 is a flowchart illustrating a service handover control method according to an embodiment of the present invention.

FIG. 4 is a flowchart illustrating a service handover control method according to an embodiment of the present invention.

Referring to FIG. 4, in operation S410, the service handover control method collects information associated with a transmitting terminal and a receiving terminal where a call is performed.

In this embodiment, the transmitting terminal and the receiving terminal may operate on an IMS based network.

In this embodiment, the information associated with the transmitting terminal and the receiving terminal may correspond to parameters associated with a network and a service profile of each of the transmitting terminal and the receiving terminal.

In this embodiment, the parameters associated with the network and the profile may correspond to a wireless access network which is accessible from a terminal, a quality of service (QoS) of the wireless access network, a session profile of the terminal, a call charge, an interface profile of the terminal, and a user profile of the terminal.

In this embodiment, the information associated with the transmitting terminal may include information about a call condition with the receiving terminal, and the information about the call condition may be included in a session description protocol (SDP) of a call invite message, having been transmitted from the transmitting terminal to the receiving terminal.

In this embodiment, the information about the call condition may correspond to a type of a medium for a call, a bandwidth, and a call charge.

In operation S420, it is determined whether service handovers occur based on the information associated with the transmitting terminal and the receiving terminal.

As a result of the determination in operation S420, it is repeatedly determined whether service handovers occur based on the collected information associated with the transmitting terminal and the receiving terminal when the service handovers do not occur in operation S430.

In this embodiment, it is determined based on updated information whether the service handovers occur when the information associated with the transmitting terminal and the receiving terminal is updated.

As a result of the determination in operation S430, a control signal which controls the service handovers of the transmitting terminal and the receiving terminal is outputted when the service handovers occur in operation S440.

In operation S450, the service handovers of the transmitting terminal and the receiving terminal are controlled based on the control signal.

Figure 5:
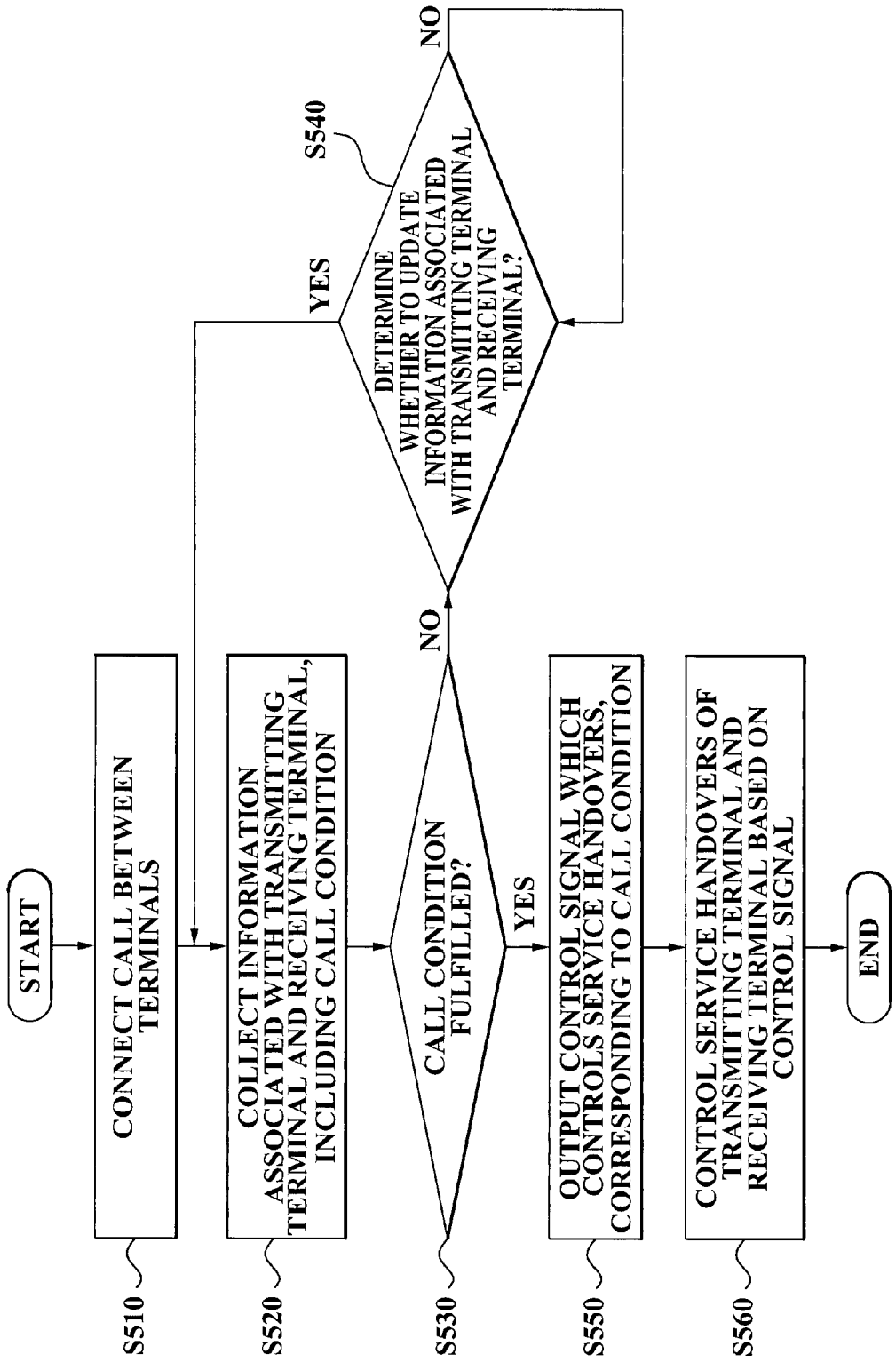
FIG. 5 is a flowchart illustrating another service handover control method according to an embodiment of the present invention.

FIG. 5 is a flowchart illustrating another service handover control method according to an embodiment of the present invention.

Referring to FIG. 5, when a call between a transmitting terminal and a receiving terminal is connected in operation S510, information associated with the transmitting terminal and the receiving terminal is collected in operation S520, the information being associated with the transmitting terminal and the receiving terminal including a call condition.

In this embodiment, the information about the call condition may correspond to a type of a medium for a call, a bandwidth, and a call charge.

In this embodiment, the information about the call condition may collect a call invite message, which is transmitted from the transmitting terminal to the receiving terminal.

In operation S530, it is determined whether the call condition is fulfilled using information associated with the transmitting terminal and the receiving terminal.

As a result of the determination in operation S530, it is determined whether to update the information associated with the transmitting terminal and the receiving terminal when the call condition is not fulfilled in operation S540, updated information is collected after the information associated with the transmitting terminal and the receiving terminal is updated, and it is determined whether the call condition is fulfilled.

As a result of the determination in operation S540, a control signal which controls the service handovers of the transmitting terminal and the receiving terminal is outputted in operation S550, when the call condition is fulfilled in operation S540.

A call which corresponds to the call condition predetermined by a user of the transmitting terminal is performed after controlling the service handovers of the transmitting terminal and the receiving terminal in operation S560.

In this embodiment, the call condition may be established by the user of the transmitting terminal.

Figure 6:
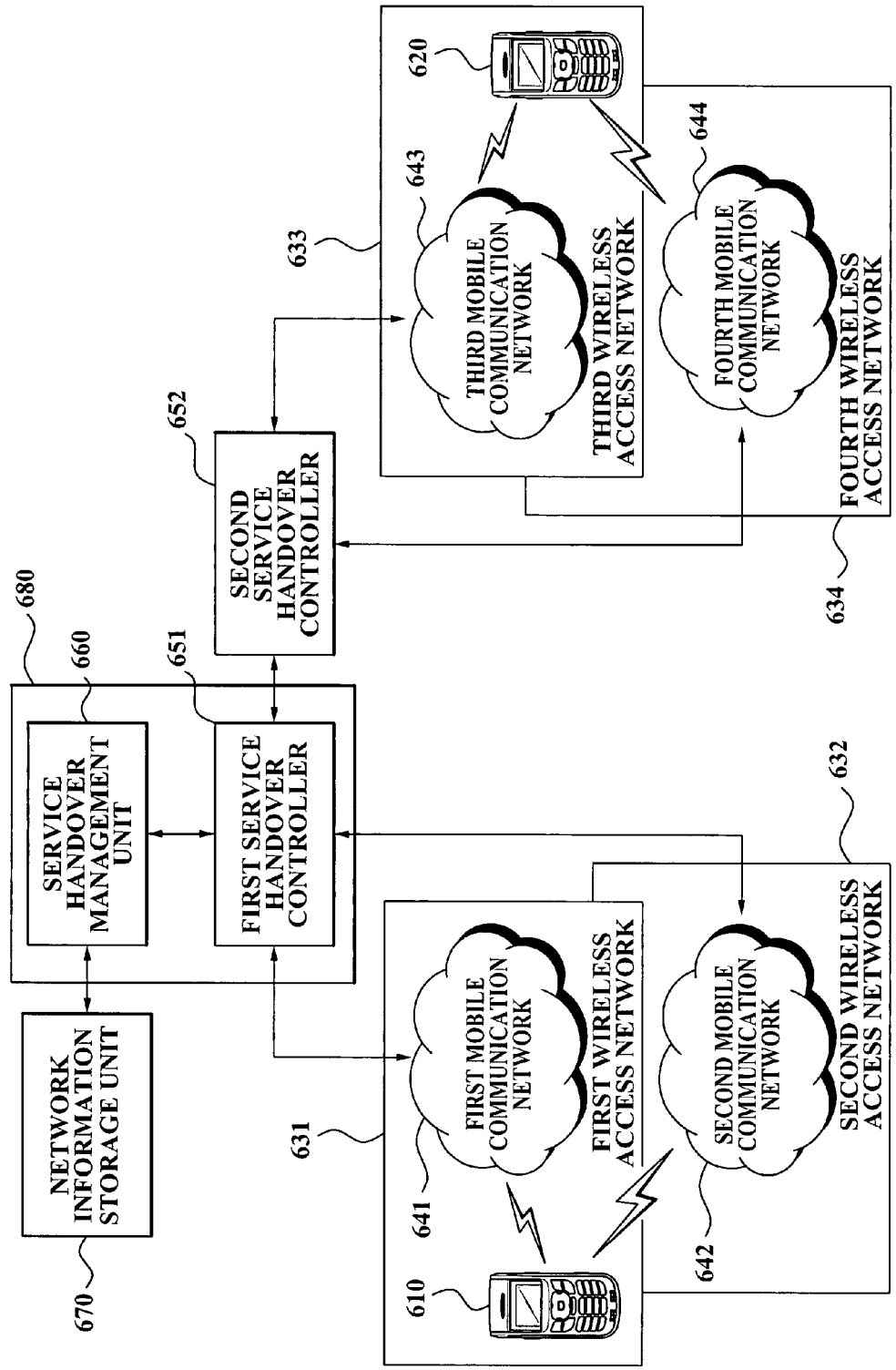
FIG. 6 is a block diagram illustrating a system utilizing a service handover control apparatus according to an embodiment of the present invention.

FIG. 6 is a block diagram illustrating a system utilizing a service handover control apparatus according to an embodiment of the present invention. Referring to FIG. 6, the system utilizing the service handover control apparatus 680 includes a transmitting terminal 610, a receiving terminal 620, a first service handover controller 651, a second service handover controller 652, a service handover management unit 660, and a network information storage unit 670.

Hereinafter, a structure of the service handover control apparatus according to the embodiment of the present invention will be described by referring to FIG. 6.

The transmitting terminal 610 communicates with the receiving terminal 620, which has accessed to a third mobile communication network 643 via a first mobile communication network 641. The transmitting terminal 610 and the first mobile communication network 641 comprise a first wireless access network 631, and the transmitting terminal 610 and a second mobile communication network 642 comprise a second wireless access network 632. The receiving terminal 620 and the third mobile communication network 643 comprise a third wireless access network 633, and the receiving terminal 620 and a fourth mobile communication network 644 comprise a fourth wireless access network 634.

The service handover control apparatus 680 controlling handovers of the transmitting terminal 610 and the receiving terminal 620 includes the service handover management unit 660 and the first service handover controller 651. Alternatively, the service handover control apparatus 680 can include the handover management unit 660 and the second service handover controller 652 without departing from the spirit and scope of the invention. The first service handover controller 651 controls a handover of the transmitting terminal 610, and the second service handover controller 652 controls a handover of the receiving terminal 620.

According to an embodiment of the present invention, the first mobile communication network 641 and the third mobile communication network 643 may utilize a different type of communication networks than a type of communication network utilized by the second mobile communication network 642 and the fourth mobile communication network 644. As an example, the first mobile communication network 641 and the third mobile communication network 643 may be circuit switching networks, and the second mobile communication network 642 and the fourth mobile communication network 644 may be packet switching networks.

The transmitting terminal 610 may access to the first and second mobile communication networks 641 and 642 to communicate, and the receiving terminal 620 may access to the third and fourth mobile communication networks 643 and 644 to communicate.

The first service handover controller 651 controls the first mobile communication network 641 the transmitting terminal 610 currently accesses, collects call connection information of the transmitting terminal 610 and network information of the first wireless access network 631, and provides the service handover management unit 660 with the collected call connection information of the transmitting terminal 610 and the network information of the first wireless access network 631.

The second service handover controller 652 controls the third mobile communication network 643 the receiving terminal 620 currently accesses, collects call connection information of the receiving terminal 620 and network information of the third wireless access network 633, and provides the service handover management unit 660 with the collected call connection information of the receiving terminal 620 and the network information of the third wireless access network 633.

When a location of the transmitting terminal 610 is changed or a service used by the transmitting terminal 610 is changed, and when a handover is performed, the transmitting terminal 610 performs a handover from the currently accessed first wireless access network 631 to the second wireless access network 632. The second wireless access network 632 may be a wireless access network associated with the first wireless access network 631, that is, may be any one of physically adjacent wireless access networks. The second wireless access network 632 may be a wireless access network type different from the first wireless access network 631, and a coverage of the first wireless access network 631 and of the second wireless access network 632 may be partially or entirely overlapped.

The service handover management unit 660 generates a control signal which controls a service handover of the transmitting terminal 610 based on call connection information of the transmitting terminal 610, call connection information of the receiving terminal 620, network information of the first wireless access network 631, and network information of the second wireless access network 632. The first service handover controller 651 controls the handover of the transmitting terminal 610 based on the control signal.

The service handover management unit 660 controls the handovers by considering a terminal performing communication, and also by considering network information of an access network the terminal currently accesses, and network information of an access network the terminal will access as a result of performing the handover. The service handover management unit 660 further considers network information of a plurality of the second wireless access networks 632, where the terminal can perform a handover, determines an optimal network to perform the handover, and enables the terminal to handover to the optimal network.

According to an embodiment of the present invention, the network information of the second wireless access network 632 may be provided from the network information storage unit 670 in response to a request of the service handover management unit 660. According to an embodiment of the present invention, the second wireless access network 632 may be indirectly connected with the first service handover controller 651. Since the first service handover controller 651 is not able to collect the network information of the second wireless access network 632 in this embodiment, the service handover management unit 660 may no longer consider network information of the second wireless access network 632.

According to an embodiment of the present invention, the second network information may include information about a network service provider operating the second wireless access network 632. The service handover management unit 660 may generate the control signal so that a terminal may perform a handover to a wireless access network being run by a specific network service provider.

According to an embodiment of the present invention, the second network information may include a list of access networks which are currently available and provide a service required by the terminal among a plurality of service provider's access networks of wireless access network 632. By limiting to a wireless access network providing the service required by the terminal, the service handover management unit 660 may determine whether the service handovers occur based on the list of access networks which are currently available. For the terminal's handover to another wireless access network, it is required to measure a wireless environment of a currently accessed wireless access network and a wireless environment of the other wireless access network. According to an embodiment of the present invention, the service handover management unit 660 may transmit the access network list which is currently available to the terminal. The terminal may measure a wireless environment of a wireless access network which provides the service required by the terminal, as opposed to all accessible wireless access networks, thereby reducing battery consumption required to measure the wireless environment.

According to an embodiment of the present invention, the second network information may include a specific base station list or a wireless access point list included in the access network list, which is currently available to the terminal. The specific base station may be a radio access station (RAS) configuring a portable Internet network such as a wireless broadband (WiBro) and a world interoperability for microwave access (WiMax), or may be a normal base station of second generation or third generation mobile telecommunication networks. The terminal does not go through procedures of accessing to the second network and receiving the list of the portable Internet base stations or the wireless access points, but may directly receive the list of the base stations or wireless access points, to handover.

According to an embodiment of the present invention, the network information storage unit 670 may collect and manage network information about another wireless access network which is adjacent to the specific wireless access network. According to an embodiment of the present invention, the network information storage unit 670 may be a media independent information service (MIIS) server defined according to IEEE 802.21 standards.

When the terminal performs a handover from the first wireless access network 631 to the second wireless access network 632, the service handover management unit 660 may not perform an optimal handover since the terminal is not able to acquire the network information of the second wireless access network 632 before directly accessing the second wireless access network 632.

According to an embodiment of the present invention, the service handover management unit 660 may control the optimal handover even when not acquiring the network information of the second wireless access network 632 via the first service handover controller 651 since the service handover management unit 660 may acquire network information of a plurality of the second wireless access networks 632 being associated with the first wireless access network 631 from the network information storage unit 670.

According to an embodiment of the present invention, the service handover management unit 660 may request network information of the second wireless access network 632 to the network information storage unit 670. The network information storage unit 670 may transmit the network information of the second wireless access network 632 to the service handover management unit 660 in response to the request of the service handover management unit 660. A control signal controlling a handover of a terminal may be generated by further considering the network information of the second wireless access network 632, which is received from the network information storage unit 670.

According to an embodiment of the present invention, call connection information of a terminal may include at least one of a service profile of the terminal, a type of a medium for a call, a bandwidth currently used, and a call charge.

According to an embodiment of the present invention, network information of the first wireless access network 631 or the network information of the second wireless access network 632 may include at least one of a type of a medium for a call provided by a network, a minimum bandwidth according to types of each medium, and a call charge.

According to an embodiment of the present invention, the service handover management unit 660 may select at least one wireless access network providing a service required by a terminal, from a plurality of second wireless access networks, make a list for the selected wireless access network, and transmit the list for the selected wireless access network to the terminal.

The terminal may measure a change of a wireless channel of a wireless access network which provides a service required by the terminal, from the plurality of the second wireless access networks, by referring to a list of wireless access networks.

The terminal transmits information about a wireless channel of a currently accessed wireless access network and information about a wireless channel of another wireless access network to the service handover management unit 660 to handover to the other wireless access network. The service handover management unit 660 controls handovers of a terminal based on a change of a wireless channel of a wireless access network, information of which is transmitted from the terminal. The terminal does not measure a change of a wireless channel of all accessible wireless access networks, but measures a change of a wireless channel of wireless access networks included in the wireless access network list, thereby reducing power consumption required to measure the change of the wireless channel. That is, from the plurality of wireless access networks, a second wireless access network to be accessed by the terminal is determined using the wireless access network list being provided from the service handover management unit 660.

Figure 7:
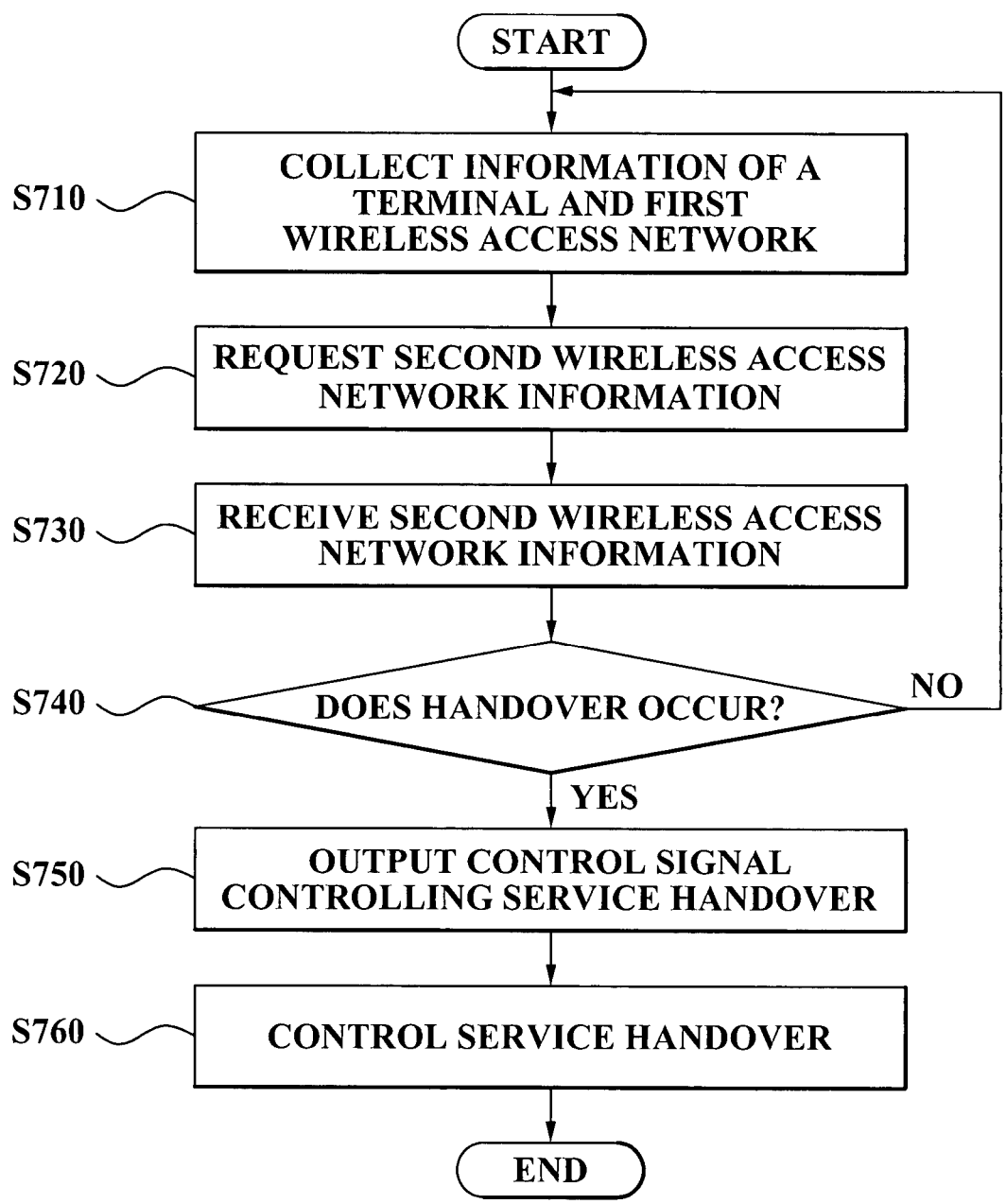
FIG. 7 is a flowchart illustrating a service handover control method according to an embodiment of the present invention.

FIG. 7 is a flowchart illustrating a service handover control method according to an embodiment of the present invention. Hereinafter, the service handover control method according to the embodiment of the present invention will be described by referring to FIG. 7.

In operation S710, call connection information of a terminal to perform a handover and the network information of the first wireless access network 631 of FIG. 6 are collected.

In operation S720, the network information of the second wireless access network 632 of FIG. 6 is requested from the network information storage unit 670 of FIG. 6.

In operation S730, the network information of the second wireless access network 632 associated with the first wireless access network 631 is received from the network information storage unit 670.

In operation S740, whether a handover occurs in the terminal is determined based on the call connection information of the terminal, the network information of the first wireless access network 631, and the network information of the second wireless access network 632.

When the handover occurs in the terminal, a control signal controlling a service handover is outputted in operation S750.

In operation S760, the handover of the terminal is controlled.

FIG. 8 is a diagram illustrating operations of a service handover control apparatus according to an embodiment of the present invention. Hereinafter, the operations of the service handover control apparatus according to the embodiment of the present invention will be described by referring to FIG. 8.

In operation S810, a receiving terminal approves a call connection in response to a call request from a transmitting terminal, and a call is connected between the receiving terminal and the transmitting terminal.

In operation S820, the service handover management unit 660 of FIG. 6 collects call connection information of the transmitting terminal, call connection information of the receiving terminal, and network information of the first wireless access network 631 of FIG. 6.

In operation S830, the service handover management unit 660 requests the network information of the second wireless access network 632 of FIG. 6 to the network information storage unit 670 of FIG. 6. The network information storage unit 670 transmits the network information of the second wireless access network 632 to the service handover management unit 660 in response to the request of the service handover management unit 660. The network information of the second wireless access network 632 received in the service handover management unit 660 is used to generate a control signal performing an optimal handover.

In operation S840, the optimal handover is performed based on the network information of the second wireless access network 632 received in the service handover management unit 660.

The service handover control method according to the above-described embodiment of the present invention may be recorded in computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like. The media may also be a transmission medium such as optical or metallic lines, wave guides, and the like, including a carrier wave transmitting signals specifying the program instructions, data structures, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention.

A service handover control apparatus and a method using the apparatus according to the present invention can perform an end-to-end service handover by collecting information associated with terminals whose calls are connected with each other.

Also, according to the present invention, an unnecessary waste of resources can be reduced using an end-to-end service handover.

Also, according to the present invention, a call quality with respect to a call condition of a transmitting terminal can be provided when the call condition, predetermined by a user of the transmitting terminal, occurs using information associated with terminals.

While the invention has shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A service handover control apparatus comprising: a service handover management unit configured to: collect information associated with a transmitting terminal or a receiving terminal which operate based on an Internet Protocol multimedia subsystem (IMS), and output a control signal that controls service handovers of the transmitting terminal and the receiving terminal based on the collected information; and a service handover controller configured to provide the service handover management unit with the information associated with the transmitting terminal or the receiving terminal, and control the service handovers of the transmitting terminal and the receiving terminal based on the control signal, wherein the information associated with the transmitting terminal comprises a parameter that corresponds to call connection information, the call connection information being collected from a call invite message transmitted by the transmitting terminal, and a parameter that corresponds to at least one of a wireless access network that is accessible from the transmitting terminal, and a user profile of the transmitting terminal, and the information associated with the receiving terminal comprises a parameter that corresponds to at least one of a wireless access network that is accessible from the receiving terminal, and a user profile of the receiving terminal.

2. The apparatus of claim 1, wherein the service handover controller is configured to
provide the service handover management unit with updated information in response to the information associated with the transmitting terminal or the receiving terminal being updated, and
output the control signal that controls the service handovers of the transmitting terminal and the receiving terminal based on the updated information.

3. The apparatus of claim 1, wherein the service handover management unit comprises:
an information collector configured to collect the information associated with the transmitting terminal or the receiving terminal;
a service handover determination unit configured to determine whether the service handovers occur based on the collected information associated with the transmitting terminal or the receiving terminal; and
a service handover provider configured to output the control signal that controls the service handovers of the transmitting terminal and the receiving terminal when the service handovers occurs.

4. The apparatus of claim 1, wherein the information associated with the transmitting terminal or the receiving terminal correspond to parameters associated with a wireless access network and a service profile of each of the transmitting terminal and the receiving terminal.

5. The apparatus of claim 1, wherein the service handover controller is configured to output the control signal based on first network information of a first wireless access network in which the transmitting and receiving terminals belong to or second network information of a second wireless access network being associated with the first wireless access network.

6. The apparatus of claim 5, wherein the second network information is received from a network information storage unit in response to a request of the service handover management unit.

7. The apparatus of claim 1, wherein the call invite message comprises a session description protocol including information corresponding to the call connection information.

8. A service handover control method comprising: collecting information associated with a transmitting terminal or a receiving terminal that operate based on an Internet Protocol multimedia subsystem (IMS); outputting a control signal that controls service handovers of the transmitting terminal and the receiving terminal based on the collected information; and controlling the service handovers of the transmitting terminal and the receiving terminal based on the control signal, wherein the information associated with the transmitting terminal comprises a parameter that corresponds to call information being collected from a call invite message transmitted by the transmitting terminal, and a parameter that corresponds to at least one of a wireless access network that is accessible from the transmitting terminal, and a user profile of the transmitting terminal, and the information associated with the receiving terminal comprises a parameter that corresponds to at least one of a wireless access network that is accessible from the receiving terminal, and a user profile of the receiving terminal.

9. The method of claim 8, further comprising:
outputting the control signal that controls the service handovers of the transmitting terminal and the receiving terminal based on updated information in response to the information associated with the transmitting terminal or the receiving terminal is updated.

10. The method of claim 8, wherein the outputting of the control signal comprises:
determining whether the service handovers occur based on the collected information associated with the transmitting terminal or the receiving terminal; and
outputting the control signal that controls the service handovers of the transmitting terminal and the receiving terminal when the service handovers occur.

11. The method of claim 8, wherein the outputting of the control signal outputs the control signal that controls service handovers based on first network information of a first wireless access network in which the transmitting and receiving terminals belong to or second network information of a second wireless access network being associated with the first wireless access network.

12. The method of claim 11, wherein the outputting of the control signal comprises:
requesting the second network information from a network information storage unit; and
receiving the second network information from the network information storage unit.

13. At least one non-transitory medium comprising computer readable instructions implementing the method of claim 8.

14. A service handover controlling apparatus controlling service handovers between a plurality of wireless access networks comprising terminals capable of communicating using the plurality of wireless access networks, wherein the service handover apparatus is configured to generate a control signal that controls the service handovers of a transmitting terminal and a receiving terminal based on call connection information of the transmitting terminal or the receiving terminal, first network information of a first wireless access network the transmitting terminal or the receiving terminal presently accesses, and second network information of a second wireless access network the transmitting terminal or the receiving terminal will access, and the call connection information being collected from a call invite message transmitted by the transmitting terminal, and the call connection information comprises at least one of a service profile of the transmitting terminal or the receiving terminal, and a call charge.

15. The apparatus of claim 14, wherein each of the first and second network information comprise at least one of a type of a medium for a call, a minimum bandwidth, and a call charge provided by each of the first and second wireless access network.

16. The apparatus of claim 14, wherein the second network information is received from a network information storage unit in response to a request of a service handover management unit.

17. The apparatus of claim 16, wherein the network information comprises at least one of information about a network service provider of the second wireless access network, an access network list of currently available access networks of the network service provider, a specific base station list, and a wireless access point list of the usable access network.

18. The apparatus of claim 14, wherein
the service handover control apparatus is configured to transmit a wireless access network list that provides a service required by the transmitting terminal or the receiving terminal, and
the second wireless access network is determined using the wireless access network list.

19. The apparatus of claim 14, wherein information corresponding to call connection information is transmitted from the transmitting terminal.

20. The apparatus of claim 14, wherein the call invite message comprises a session description protocol including information corresponding to the call connection information.

21. A service handover control method controlling service handovers between a plurality of wireless access networks of terminals capable of communicating using the plurality of wireless access networks, the method comprising: generating a control signal that controls the service handovers of a transmitting terminal and a receiving terminal based on call connection information of the transmitting terminal or the receiving terminal, first network information of a first wireless access network the transmitting terminal or the receiving terminal currently accesses, and second network information of a second wireless access network the transmitting terminal or the receiving terminal will access; and controlling a service handover of the transmitting terminal and the receiving terminal based on the control signal, and wherein the call connection information is collected from a call invite message transmitted by the transmitting terminal, and the call connection information comprises at least one of a service profile of the transmitting terminal or the receiving terminal, and a call charge.

22. The method of claim 21, wherein each of the first and second network information comprise at least one of a type of a medium for a call, a minimum bandwidth, and a call charge provided by each of the first and second wireless access networks.

23. The method of claim 21, further comprising:
requesting the second network information; and
receiving the second network information,
wherein the receiving of the second network information comprises receiving the second network information from a network information storage unit.

24. The method of claim 21, wherein the second network information comprises at least one of information about a network service provider of the second wireless access network, an access network list of currently available access networks of the network service provider, a specific base station list and a wireless access point list of the usable access network.

* * * * *